(12) United States Patent
Boos et al.

(10) Patent No.: US 6,316,124 B1
(45) Date of Patent: Nov. 13, 2001

(54) MODIFIED INAS HALL ELEMENTS

(75) Inventors: John Bradley Boos, Springfield; Walter Kruppa, Mclean; Brian R. Bennett, Arlington, all of VA (US); Ming-Jey Yang, Silver Spring, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/482,053

(22) Filed: Jan. 13, 2000

(51) Int. Cl.$^7$ ...................................................... B32B 15/00
(52) U.S. Cl. ......................... 428/642; 428/620; 428/650; 428/450; 428/213; 428/697; 323/294; 323/368; 257/194
(58) Field of Search ..................................... 428/548, 600, 428/610, 615, 620, 642, 650, 450, 656, 655, 697, 641, 213; 257/194; 323/294, 368

(56) References Cited

U.S. PATENT DOCUMENTS 5,364,816 * 11/1994 Boos et al. ............................ 437/133
5,798,540 * 8/1998 Boos et al. ............................ 257/194
6,133,593 * 10/2000 Boos et al. ............................ 257/194

OTHER PUBLICATIONS

Zhao, et al., "Kink Free Characteristics of AlSb/InAs High Electron Mobility Transistors with Planar Si Doping Beneath the Channel", IEEE Transactions on Electron Devices, vol. 45, No. 1, Jan. 1998.*

* cited by examiner

Primary Examiner—Deborah Jones
Assistant Examiner—Stephen Stein
(74) Attorney, Agent, or Firm—John J. Karasek; George A. Kap

(57) ABSTRACT

This invention pertains to more sensitive and more stable electronic devices which can sense electrical and magnetic fields. The devices are characterized by InAs channels confined on both sides thereof by a wide band gap AlSb material; protective layers above the AlSb material; modulation doping above the AlSb material; and layers of the InAs channel material containing 1 to 99 mol percent antimony, with the channel material being deposited in the form of alternating monolayers of InSb and InAs, of a ternary mixture of InAsSb.

25 Claims, 4 Drawing Sheets

MODIFIED INAS HALL ELEMENTS

BACKGROUND OF THE INVENTION

1. Field of the Invention

This invention pertains to a Hall element electronic device with an InAs channel which has high sensitivity and enhanced stability over a large temperature range and which can sense electrical and magnetic fields.

2. Description of Related Art

Hall elements using III-V semiconductor materials have widespread use for a variety of military and commercial applications. They are mostly commonly used as magnetic field sensors in small DC brushless motors found in electronic consumer equipment such as video cassette recorders, personal computers, and compact disk drives. They also are used for position, tilt-level, pressure and thickness sensing as well as in tachometers, compasses, magnetizers, and electronic measurement equipment used to detect current, voltage, power, frequency, and magnetic field. They are also used in the non-destructive evaluation of materials to detect hair line cracks in metals for such applications as wing and fuselage inspection.

In 1995, approximately one billion Hall sensors were manufactured worldwide. The market for such sensors is growing rapidly, and many new applications for the contactless sensors are expected in the future because they can detect static as well as variable magnetic and electric fields.

Hall sensors using InSb material are the most prevalent Hall elements used today compared to those which are composed of GaAs or InAs material. The attractive features of the InSb Hall sensors are high sensitivity, low power consumption, and small offset voltage. Due to the narrow band gap of InSb, however, these Hall sensors have a large temperature dependance which limits their use to near room temperature applications.

InAs Hall sensors are more stable over a wider temperature range, and thus are needed for many present and future applications which have more severe operating conditions. For example, automotive sensors located in the engine compartment or outside the body frame are required to operate over a temperature range from −40° C. to 150° C. Compared to InSb Hall sensors, InAs Hall sensors also have a better stability against pulse voltage noise, lower offset voltage drift, and lower noise properties which enable sensing of smaller magnetic fields.

To meet the demand for improved performance, considerable effort has focused on the development of advanced material growth and device fabrication technology using the AlSb/InAs materials system. AlSb/InAs Hall sensors use AlSb/InAs heterojunctions to form an InAs deep quantum well. This approach is preferred over InAs material obtained using conventional thin film technology due to the attractive features of this heterojunction material system, which include high electron mobility and velocity, high sheet charge density, good carrier confinement, and enhanced design flexibility.

Accurately controlled "band-gap engineered" layer designs with feature sizes on the atomic scale can be used to exploit desirable quantum confinement effects within the structure. As a result of these unique and substantially improved material properties, AlSb/InAs-based quantum well Hall elements are particularly suitable for present and future sensor applications.

To realize high sensitivity in a Hall element, a high electron mobility is required for the InAs layer. Compared to GaAs Hall elements, the lower electron effective mass of InAs gives this material system a significant advantage in the room-temperature mobility which can be achieved for a given sheet charge density.

Compared to other III-V semiconductor material systems, such as GaAs and InP, AlSb/InAs material growth and device fabrication technology is relatively immature. However, recent progress in these areas has enabled antimonide-based devices to be produced with higher mobilities, higher sheet carrier concentrations, lower contact resistance, and improved overall performance. As an example, AlSb/InAs high-electron mobility transistors (HEMTs) have recently been fabricated which exhibit high frequency performance which constitutes the state-of-the-art at low drain voltage.

OBJECTS AND BRIEF SUMMARY OF THE INVENTION

An object of this invention is an electronic device with high sensitivity and enhanced stability over a large temperature range.

Another object of this invention is an electronic device with high electron mobility and increased sheet charge density in the channel.

Another object of this invention is an electronic device with a modified InAs channel which can be tuned to optimize sensitivity and operating temperature.

These and other objects of this invention can be achieved by an electronic device Hall element which is characterized by increased electron mobility in the InAs channel or in the

DETAILED DESCRIPTION OF THE INVENTION

Figure 1:
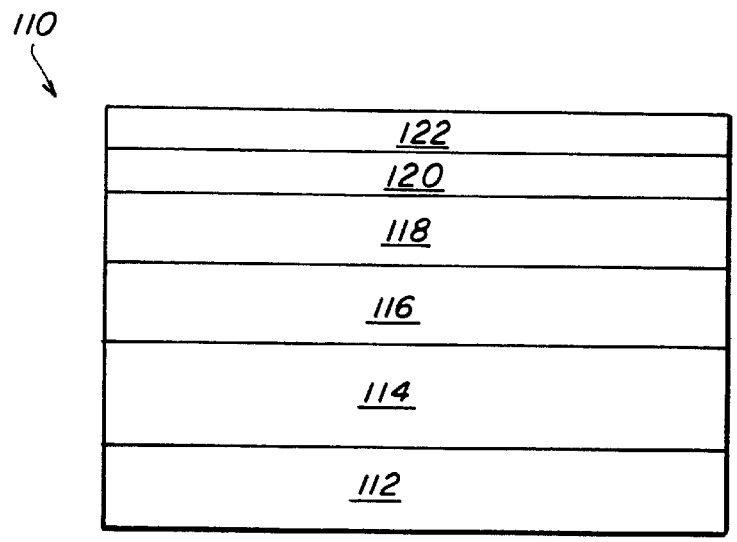
FIG. 1 is a schematic illustration of the first embodiment of an AlSb/InAs Hall element in cross-section showing the InAlAs/AlSb barrier layer without the ohmic contacts on the top layer.

This invention pertains to electronic devices having increased sensitivity and stability over a wide temperature range. These devices are characterized by an InAs channel or modified on InAs channels that have higher electron mobility than conventional electron devices with InAs channels.

The invention herein is illustrated by three embodiments each of which contains an InAs channel or a modified InAs channel. Due to the heterostructure of the electronic devices in the three embodiments, the channels in the embodiments have increased electron mobility which translates into better sensitivity over a wide temperature range and other advantages.

The first embodiment contains the AlSb/InAs heterojunction which increases electron mobility of the InAs channel. Due to the high aluminum content, the AlSb layer of the device is reactive in air and is capped with a second more stable barrier layer to prevent oxidation. The InAlAs/AlSb/InAs material of the first embodiment was grown by molecular beam epitaxy at 510° C. on an undoped (100) GaAs substrate.

The lack of an AlSb barrier layer with sufficient chemical stability has been a considerable drawback which has limited the performance and usefulness of AlSb/InAs Hall elements. To improve chemical stability, design of the electronic devices of the first embodiment contains an InAlAs/AlSb composite barrier layer above the InAs channel. Since the InAlAs second barrier layer is chemically stable, Hall elements or electronic devices of the first embodiment can be more easily fabricated and are more reliable.

Electron mobility in the channel of the second embodiment is higher than that of the first embodiment. In addition to the AlSb/InAs heterojunction which increases electron mobility in the InAs channel, the second embodiment also includes modulation doping which further increases electron mobility in the channel, as well as sheet charge density. These benefits are imparted to the device by a silicon doped InAs layer or InAs(Si) layer disposed above the InAs channel. Amount of the silicon atoms doped into the InAs monolayers can be varied to meet the desired demand—the more of the silicon atoms introduced into the InAs material, the higher will be the electron mobility.

Modulation doping is used to achieve higher electron mobility by spatially separating electrons in the narrow band-gap InAs channel from their parent donor atoms in the AlSb wide band-gap barrier material. The electrons in the channel can travel faster since they are not impeded by the ionized impurity scattering which would otherwise occur. The considerably larger conduction band discontinuity ($\Delta E_c$=1.35 eV) at the barrier/channel interface enables formation of a deeper quantum well and the associated benefits of a larger 2DEG sheet charge density and superior carrier confinement.

In the third embodiment, antimony is deposited into the InAs channel in order to improve sensitivity although there is a trade-off of sensitivity and operating temperature range. If sensitivity is improved, what is sacrificed to obtain the improved sensitivity is the operating temperature range. InAs has a narrow band gap of about 0.35 eV and a high electron mobility of about 30,000 $cm^2$/Vs whereas InSb has narrow band gap of about 0.17 eV and a high electron mobility of about 50,000 $cm^2$/Vs. The sensitivity is increased with higher electron mobility and sheet charge density and the operating temperature range is decreased with higher antimony content in the channel.

It has been confirmed, on the basis of infrared photoluminescence measurements, that addition of antimony to the InAs channel changes the energy band structure from a staggered type-II heterojunction lineup to a type-I alignment. Type-I heterojunction lineup is preferred to type-II since a type-I lineup functions as an improved barrier to hole flow in the valence band and thereby gives lower leakage current and less of a trapping effect.

Schematic illustration of the first embodiment is shown in FIG. 1, which is a cross-sectional view of an electronic device or a Hall element of this invention. FIG. 1 shows a cross-sectional view of an electronic device 110 wherein AlSb buffer layer 114 is disposed on a semi-insulating GaAs substrate 112, then InAs channel layer 116 is disposed on the buffer layer 114, AlSb barrier layer 118 is disposed on the channel layer 116, InAlAs barrier layer 120 is disposed on the barrier layer 118, and InAs cap layer 122 is disposed on the second barrier layer 120. The substrate and the various layers thereon of the electronic device disclosed herein can be of any desired thickness, however, typically substrate 112 is 200 to 700 µm, more typically 400 to 500 µm thick; buffer 114 is typically 0.1 to 10 µm, more typically 1 to 5 µm thick; channel 116 is typically 10 to 500 Å, more typically 50–300 Å thick; first barrier 118 is typically 10–500 Å, more typically 50–300 Å thick; second barrier 120 is typically 10–500 Å, more typically 20–200 Å thick; and cap 122 is typically 5–200 Å, more typically 10–50 Å thick.

The actual electronic device shown in FIG. 1 had the following thicknesses: substrate 112, 450 µm; buffer 114, 2.4 µm; channel 116, 150 Å; barrier 118, 125 Å; barrier 120, 50 Å and its composition was $In_{0.5}Al_{0.5}As$; and cap 122, 20 Å.

The second barrier layer 120 is provided on the first AlSb barrier layer 118 due to the high aluminum content in barrier layer 118, which is reactive in air. Barrier 120 acts as a protective layer from oxidation for AlSb barrier 118. Maximum amount of aluminum in barrier layer 120 is about 80% mole fraction that would still allow the InAlAs barrier to act as a protective layer for the AlSb barrier 118. Obviously, lower amounts of aluminum in the barrier layer 120 than about 80% mole fraction will enable the barrier 120 to act as a protective layer for the AlSb barrier layer 118, however, sufficient amount of aluminum in the barrier 120 should be used so that its band gap is greater than that for the channel 116. It is estimated on the basis of its band gap, that the minimum amount of aluminum in the barrier 120 should be about 20% on molar basis.

The InAlAs/AlSb/InAs material of the first embodiment shown in FIG. 1 and in the other embodiments, is typically grown in a known way by molecular beam epitaxy at an elevated temperature. Device sample of the first embodiment, schematically shown in FIG. 1, was grown by molecular beam epitaxy at 510° C. on an undoped (100) GaAs substrate 112. The 2.4 µm undoped AlSb buffer layer 114 was grown first followed by the undoped 150 ÅÅ InAs channel layer 116, the 125 Å undoped AlSb barrier layer 118, a 50 Å undoped $In_{0.5}Al_{0.5}$ As barrier layer 120, and finally the 20 Å undoped InAs cap layer 122. The 2.4 µm thick AlSb buffer layer accommodates the 7% lattice mismatch between the device material and the GaAs substrate.

Figure 2:
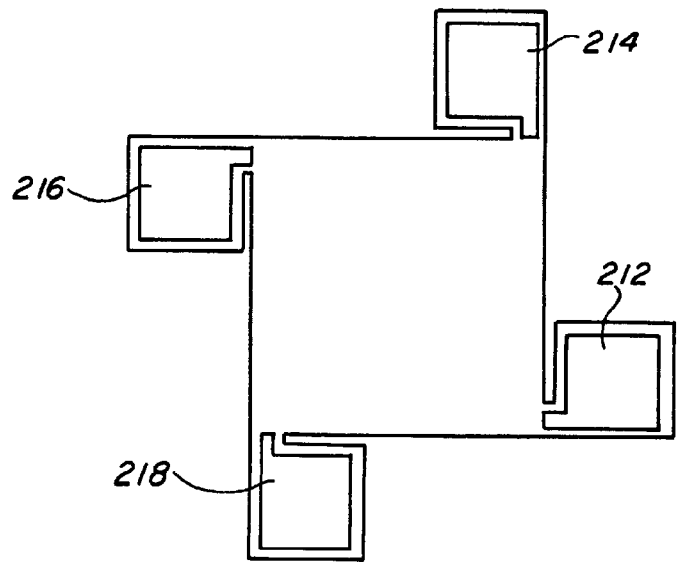
FIG. 2 is the top view of FIG. 1 showing the Pd/Pt/Au ohmic contacts.

FIG. 2 is a top view of FIG. 1 and shows four ohmic contacts 212, 214, 216 and 218 which are typically rectangular, as shown, although they can be in any other desired shape. Each of the embodiments disclosed herein has the ohmic contacts on its top or cap layer. Although any suitable ohmic contact material can be used, preferred is a contact containing a palladium layer in contact with the cap layer 122, a barrier layer above the palladium layer, and a gold layer above the barrier layer. The barrier layer can be platinum , titanium, titanium tungsten, platinum silicide, titanium carbide, tungsten carbide, or a mixture thereof. Preferred barrier material is platinum. Thickness of the ohmic contact before heat treatment is as follows: palladium layer, typically 10–1000 Å, more typically 50–500 Å; barrier layer, typically 50 –1000 Å, more typically 100–500 Å; and gold layer, typically 100–5000 Å, more typically 200–2000 Å.

The ohmic contacts on the device sample of FIG. 1 were defined first using a PMMA-based resist and deep UV lithography. The Pd/Pt/Au ohmic contacts were 100 Å, 200 Å, 600 Å thick., respectively, and were formed using e-beam evaporation, acetone liftoff, and heat treatment at 175° C. using a hot plate located within a glove box containing a $H_2$: $N_2$ (5%: 95%) gas mixture at ambient conditions. The sample was heat treated for 3 hours to ensure sufficient reaction of the palladium. The device sample isolation was achieved by wet chemical etching.

The Pd/Pt/An ohmic contact employs the low temperature reactivity of palladium but uses platinum diffusion barrier to prevent gold from reacting with the semiconductor material. No reaction was observed, as determined by using scanning electron microcopy in the region adjacent to the contacts. The contacts had a smooth featureless surface morphology and good definition.

Figure 3:
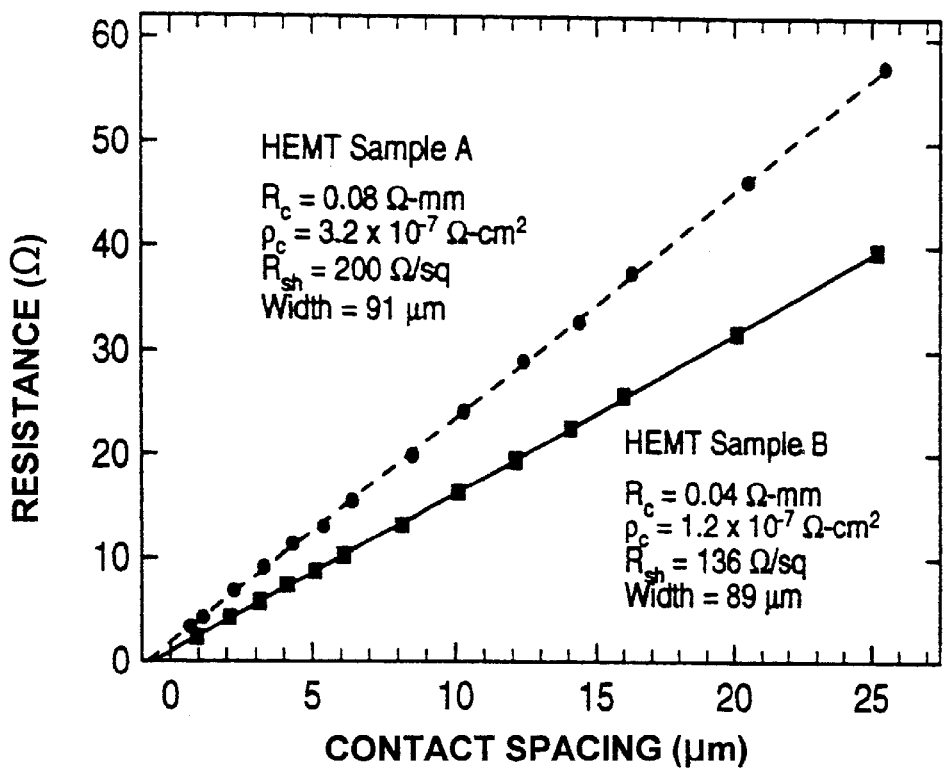
FIG. 3 is a graph of Resistance v. Contact Spacing showing transmission line model measurements of the Pd/Pt/Au ohmic contacts.
Figure 4:
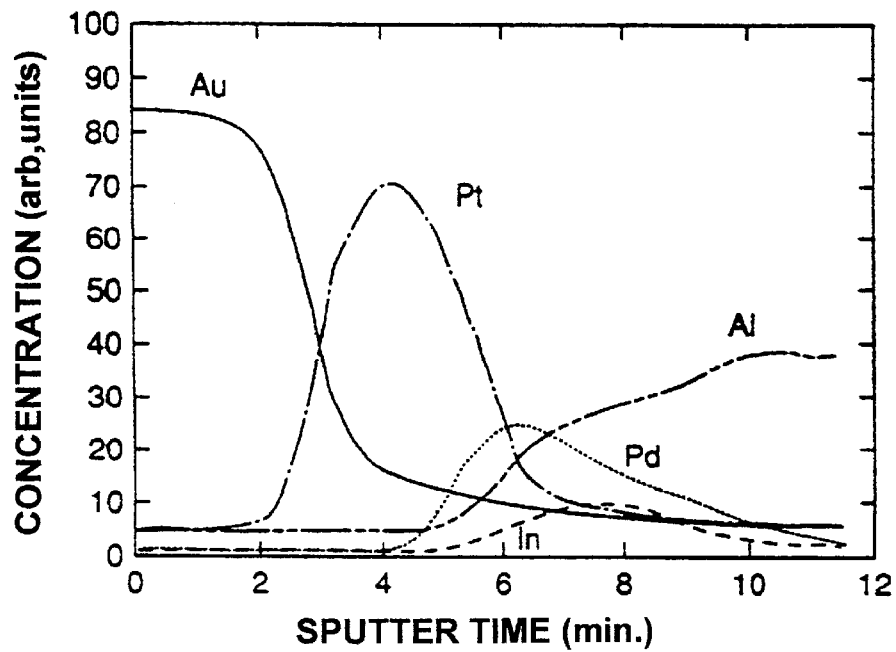
FIG. 4 is a graph of Concentration v. Sputter Time showing Auger profile of a Pd/Pt/Au ohmic contact after a hot plate heat treatment of 175° C. for 3 hours.

Transmission line model measurements for the Pd/Pt/Au contact is shown in FIG. 3 for two sampled (A & B) of similar material. A contact resistance as low as 0.04 Ω-mm can be obtained. As shown in FIG. 4, auger depth profiling reveals for the device sample of FIG. 2 that palladium had diffused to a depth slightly beyond the InAs channel layer 116. It is also observed from FIG. 4 that the platinum layer served as an effective diffusion barrier which prevented the gold from reacting with the semiconductor material.

For the device sample of FIGS. 1 and 2, at 300K and for an input current of 1 mA, the measured Hall output voltage was 140 mV for a moderate magnetic field of 2 KG. These values correspond to a good open circuit product sensitivity constant, $k_{HOC}$, of 70 mV/mA-KG and a low sheet carrier density of $9 \times 10^{11}/cm^2$. The Hall mobility of the starting material was 29,000 $cm^2/Vs$, which is excellent for the InAs but can be about 50,000 $cm^2/Vs$ for InSb. Despite the 4% lattice mismatch of the InAlAs material with respect to AlSb and InAs, the InAlAs layer was continuous.

To test the effects of the InAlAs layer on the transport properties of InAs channels, a set of 5 samples were grown with varying thickness of the barrier layer 120. The heterostructures were identical except for the thickness of the $In_{0.5}Al_{0.5}As$ barrier layer 120, which was 0 Å, 20 Å, 40 Å, 100 Å and 500 Å thick. The InAlAs layers were separated from the InAs channel by 125 Å of AlSb, as shown in FIG. 1. The room temperature electron mobility and sheet carrier density were not correlated with the InAlAs thickness. Electron mobilities ranged from 20,000 $cm^2/Vs$ to 240,000 $cm^2/Vs$ and sheet carrier densities ranged from $1.3 \times 10^{12}/cm^2$ to $1.6 \times 10^{12}/cm^2$.

Figure 5:
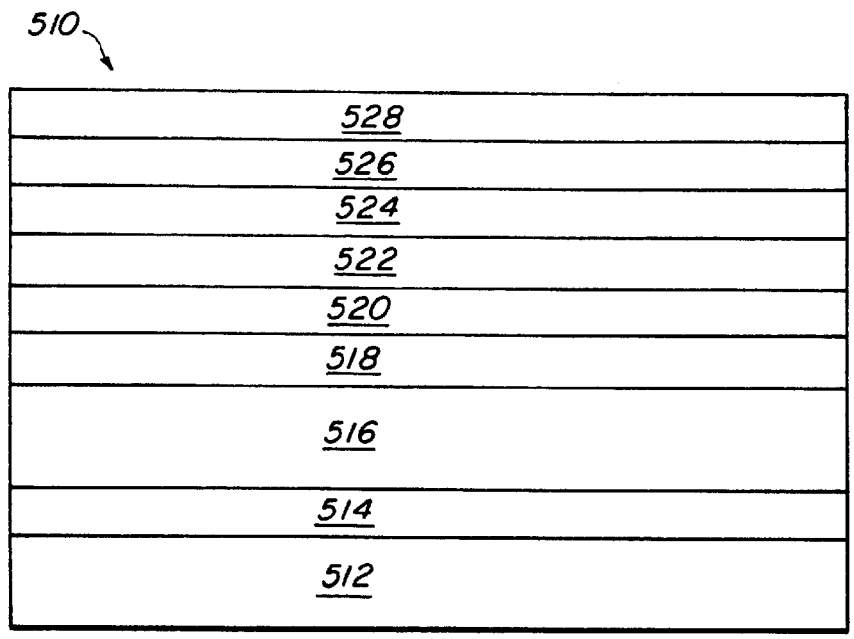
FIG. 5 is a schematic illustration of the second embodiment of an AlSb/InAs Hall element in cross-section with InAs (Si) modulation doping disposed above the AlSb layer and above the InAs channel.

The second embodiment of the electronic device is schematically illustrated in crosssection in FIG. 5, where electronic device 510 was fabricated by electron beam epitaxy by depositing on the GaAs substrate 512, GaAs layer 514, followed by AlSb layer 516, InAs layer 518, AlSb layer 520, InAs (Si) layer 522, InAs layer 524, AlSb layer 526, and InAs layer 528. Although thickness of the various layer can be varied widely to suit individual needs, layer thickness of the specific device sample of FIG. 5 was as follows: GaAs layer 514—0.3 μm, AlSb layer 516—2.4 μm, InAs layer 518—150 Å, AlSb layer 520—125 Å, InAs (Si) layer 522—6 Å, InAs layer 524—3 Å,.AlSb layer 526—100 Å, and InAs layer 528—20 Å. The substrate was 450 μm thick. The thin Si-doped InAs layer was inserted 125 Å above the 150 Å undoped InAs channel or quantum well. The Si-doped InAs layer consisted of two monolayers of InAs (Si) followed by a single monolayer of undoped InAs.

The undoped InAs channel layer 518 and the adjacent AlSb layers 516 and 520 were grown at above 500° C. and the growth temperature of the InAs (Si) donor layers 522 and 524 and the 125 Å AlSb layer 526 immediately above the donor layers was lowered to 380° C. to minimize silicon segregation.

The second embodiment of the electronic device of FIG. 5 is characterized by the thin doped InAs layer in the upper AlSb barrier, the dopant being silicon or any other n-type dopant.

In reference to the embodiment of FIG. 5, electron Hall mobility and sheet carrier concentration of the starting material were 17,000 $cm^2/Vs$ and $2.5 \times 10^{12}/cm^2$, respectively. Additional measurements on material grown with a second InAs (Si) donor layer below the well indicated a carrier density of $5.6 \times 10^{12}/cm^2$ and electron mobility of $1.34 \times 10^4$ $cm^2/Vs$ at 300K.

Results with respect to the second embodiment of FIG. 5 indicate the silicon doping in a thin InAs layer located adjacent to the AlSb barrier layer 520 can be used to produce layers with high sheet charge density. Electron Hall mobilities of 100,000 $cm^2/Vs$ at 77K and 180,000 $cm^2/Vs$ at 4K have been demonstrated and still higher electron mobilities and sheet charge densities are possible.

Figure 6:
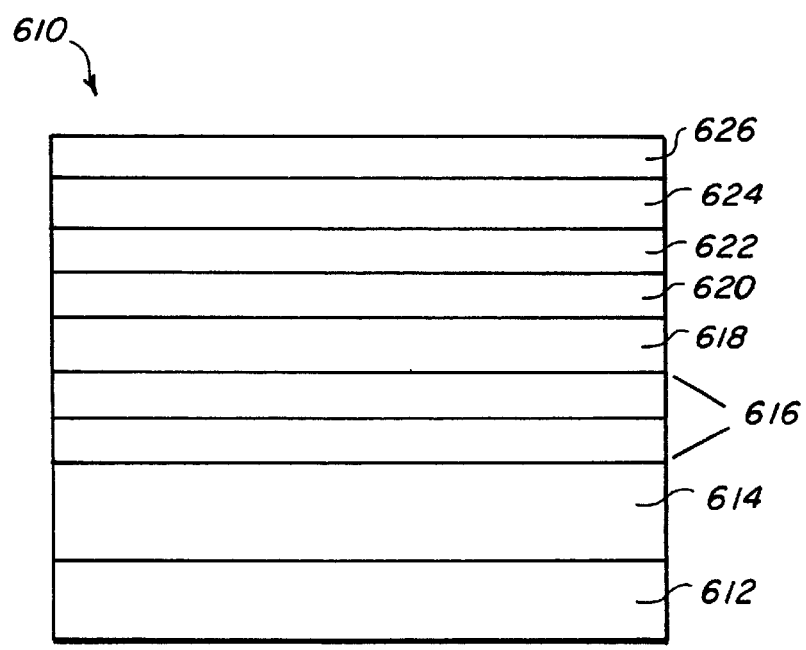
FIG. 6 is a schematic illustration of the third embodiment of an AlSb/InAsSb Hall element in cross-section.

The third embodiment is shown in FIG. 6 where the electronic device is fabricated with an InAsSb channel containing 1–99%, preferably 2–40% antimony, on molar basis. This embodiment has higher sensitivity than the second embodiment due to the antimony in the InAs channel. The channel can consist of alternating layers of InSb and InAs or it can be a ternary mixture InAsSb.

The device 610 shown in FIG. 6 can be fabricated by molecular beam epitaxy by depositing at an elevated temperature AlSb layer 614 on the GaAs substrate 612; followed by layer 616 consisting of any number of periods until the desired channel or quantum well thickness is grown, of InSb and InAs; AlSb layer 618; doped InAs layer 620; AlSb layer 622; InAlAs layer 624; and undoped InAs layer 626.

The specific device sample of FIG. 6, grown at 400° C. as a digital alloy superlattice, had the following layer thickness; AlSb layer 614—2.1 μm; $InAs_{0.8}Sb_{0.2}$ channel layer 616—about 50 Å consisting of 10 periods of one monolayer of InSb and four monolayers of InAs with each monolayer being about 3 Å thick; AlSb layer 618—125 Å; InAs (Si) layer 620—12 Å; AlSb layer 622—12 Å; $In_{0.4}Al_{0.6}Al$ layer 624—40 Å; and InAs layer 626—20 Å. The substrate 612 was 450 microns. Here, modulation doping was achieved through the use of the thin silicon doped InAs layer 620 located 125 Å above the AlSb barrier layer 618.

Infrared photoluminescence measurements at 5K confirm that the addition of antimony into the InAs channel in the FIG. 6 embodiment, changes the band structure of the device from a staggered type II heterojunction lineup to type I. Type I alignment acts more as a barrier, compared to a type II alignment, thereby giving a lower leakage current and less trapping effect.

The sheet carrier density and electron mobility of the starting material of the specific device sample of the third embodiment of FIG. 6 at 300K were $1.4 \times 10^{12}/cm^2$ and 13,400 $cm^2/Vs$, respectively.

Figure 7:
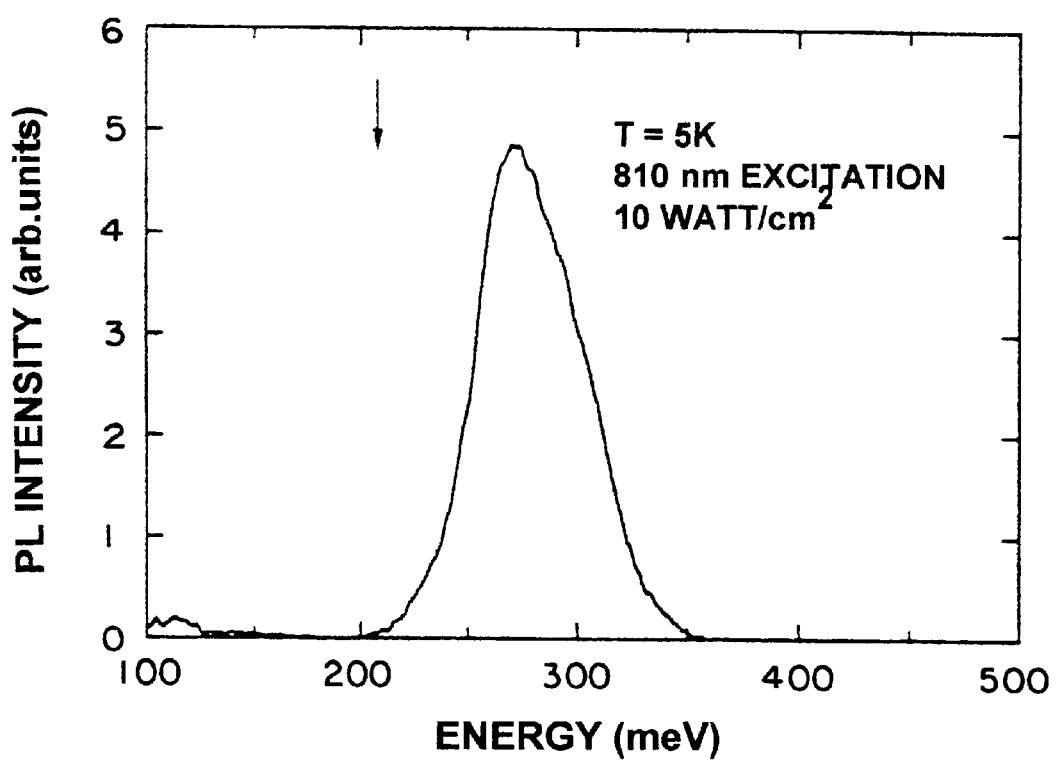
FIG. 7 is an infrared photoluminescence spectrum from a 150 Å thick AlSb/InAs$_{0.8}$Sb$_{0.2}$ layer of the third embodiment shown in FIG. 6.

To confirm the type I alignment between AlSb and $InAs_{0.8}Sb_{0.2}$, photoluminescence measurements were carried out at 5K with a Fourier transform infrared spectrometer. Samples were mounted on a cryogenic dewar and excited with an 810 nm laser diode. The room temperature blackbody radiation was eliminated by a double-modulation technique. FIG. 7 shows the photoluminescence spectrum from the $InAs_{0.8}Sb_{0.2}$ single quantum well. In contrast to the nonluminous AlSb/InAs single quantum wells, this sample exhibited bright luminescence at 272 meV. The arrow in FIG. 7 indicates the measured band gap energy for a thick 880 Å InAs$_{0.8}$Sb$_{0.2}$ digital superlattice. The results imply that the lowest subband energy for a 150 Å InAs$_{0.8}$Sb$_{0.2}$ quantum well is 62 meV, consistent with k.p calculations.

While presently preferred embodiments have been shown of the novel electronic device and of the several modifications thereof, persons skilled in this art will readily appreciate that various additional changes and modifications may be made without departing from the spirit of the invention as defined differentiated by the following claims.

What is claimed is:

1. A Hall element comprising a GaAs substrate, a first AlSb layer disposed over and in contact with said substrate, a first InAs layer disposed ober and in contact with said first AlSb layer, a second AlSb layer disposed over and in contact with said first InAs layer, an InAlAs layer disposed over and in contact with said second AlSb layer, and a second InAs layer disposed over and in contact with said InAlAs layer.

2. The device of claim 1 including at least two ohmic contacts disposed over and being in contact with said second InAs layer.

3. The device of claim 2 wherein thickness of said layers is as follows: said first AlSb layer, 0.1 to 10 µm; said first InAs layer, 10 to 500 Å; said second AlSb layer 10–500 Å; said InAlAs layer, 10 to 500 Å, said InAlAs layer containing 20 to 80 mole percent aluminum; said second InAs layer, 5–200 Å, said ohmic contacts being Pd/Pt/Au wherein said palladium layer is 10 to 1000 Å thick, said platinum layer is 50 to 1000 Å thick; said gold layer is 100 to 5000 Å thick.

4. The device of claim 3 wherein thickness of said layers, including said layers in said ohmic contacts, is as follows: said first AlSb layer, 1 to 5 µm; said first InAs layer, 50–300 Å; said second AlSb layer, 50 to 300 Å; said InAlAs layer, 20 to 200 Å; said second InAs layer, 10 to 50 Å; said palladium layer, 50 to 500 Å; said platinum layer, 100 to 500 Å; said gold layer, 200 to 2000 Å.

5. The device of claim 4 including an InAs layer doped with an n-type material disposed above and being in contact with said second AlSb layer which itself is disposed above and is in contact with said first InAs layer.

6. The device of claim 5 including third undoped InAs layer disposed above and being in contact with said doped InAs layer.

7. The device of claim 6 wherein the thickness of said third undoped InAs layer is about 1 to about 50 Å and thickness of said doped InAs layer is about 1 to about 100 Å.

8. The device of claim 6 wherein thickness of said third undoped InAs layer is about 3 Å, and thickness of said doped InAs layer is about 6 Å; said doped InAs layer being doped with silicon.

9. The device of claim 8 wherein said first InAs layer disposed above said first AlSb layer contains antimony in an amount of 1–99%, on molar basis.

10. The device of claim 8 wherein said first InAs layer disposed above said first AlSb layer contains antimony in an amount of 2–40%, on molar basis.

11. The device of claim 9 wherein said first InAs layer disposed above said first AlSb layer is a channel which consists of alternating monolayers of InSb and InAs.

12. The device of claim 11 wherein said monolayers are atomic monolayers of InSb and InAs.

13. The device of claim 11 wherein said alternating InSb monolayers are each about one monolayer thick and said alternating InAs monolayers are each about four monolayers thick.

14. A Hall element comprising of GaAs substrate, a GaAs layer disposed over said substrate; first AlSb layer disposed over said GaAs layer; first InAs layer disposed over said first AlSb layer; second AlSb layer disposed over said first InAs layer; an InAs (Si) layer disposed above said second AlSb layer; a second InAs layer disposed over said InAs (Si) layer; a third AlSb layer disposed over said second InAs layer; and a third InAs layer disposed over said second InAs layer.

15. The device of claim 14 including at least two ohmic contacts disposed over and being in contact with said third InAs layer.

16. The device of claim 15 wherein thickness of said layers are on the order of as follows; said GaAs layer, 0.3 µm; said first AlSb layer, 2.4 µm; said first InAs layer, 50 Å; said second AlSb layer, 125 Å; said InAs (Si) layer, 6 Å; said second InAs layer, 3 Å; said third AlSb layer, 100 Å; said third InAs layer, 20 Å; said ohmic contacts being Pd/Pt/Au wherein said palladium layer is 10 to 1000 Å thick; said platinum layer is 50 to 1000 Å thick; said gold layer is 100 to 5000 Å thick.

17. The device of claims 15 wherein ohmic contacts are Pd/Pt/Au and thickness thereof is as follows; said palladium layer, 50 to 500 Å; said platinum layer, 100 to 500 Å; and said gold layer, 200 to 2000 Å.

18. The device of claim 17 including an InAlAs layer disposed below said third InAs layer.

19. The device of claim 17 including an InAlAs layer disposed between said third AlSb layer and said thin InAs layer.

20. An electronic device comprising GaAs substrate; a first AlSb layer disposed over said substrate; an InAs channel layer containing 1–99 mol percent antimony disposed over said first AlSb layer; a second AlSb layer disposed over said channel layer; InAs (Si) layer disposed over said second AlSb layer; a third AlSb layer disposed over said InAs (Si) layer; an InAlAs layer disposed over said third AlSb layer, said InAlAs layer containing 20 to 80 mol percent antimony; and a second InAs layer disposed over said InAlAs layer.

21. The device of claim 20 including at least two ohmic contacts disposed over and being in contact with said third InAs layer.

22. The device of claim 21 wherein thickness of said layers is as follows; said first AlSb layer, 1 to 10 µm; said channel layer, 10 to 500 Å; said second AlSb layer, 10–500 Å; said InAs (Si) layer, on the order of 12 Å; said third AlSb layer, on the order of 12 Å; said InAlAs layer, on the order of 40 Å; said second InAs layer, 5–2000 Å; said ohmic contacts being Pd/Pt/Au wherein said palladium layer is 10 to 1000 Å thick; said platinum layer is 50 to 1000 Å thick; said gold layer is 100 to 5000 Å thick.

23. The device of claim 22 wherein thickness of said ohmic contacts is as follows: said palladium layer, 50 to 500 Å; said platinum layer, 100 to 500 Å; and said gold layer, 200–2000 Å.

24. The device of claim 23 wherein said channel layer consists of alternating atomic monolayers of InSb and InAs.

25. The device of claim 24 wherein said alternating InSb monolayers are each about one monolayer thick and said alternating InAs monolayers are each about four monolayers thick.

* * * * *